US012800361B2

(12) United States Patent
Hu et al.

(10) Patent No.: US 12,800,361 B2
(45) Date of Patent: Nov. 17, 2026

(54) CASCADED DFOS TO REDUCE SYSTEM COST AND INCREASE SENSING REACH

(71) Applicant: NEC Laboratories America, Inc., Princeton, NJ (US)

(72) Inventors: Junqiang Hu, Davis, CA (US); Ting Wang, West Windsor, NJ (US); Yue-Kai Huang, Princeton, NJ (US)

(73) Assignee: NEC Corporation, Tokyo (JP)

( * ) Notice: Subject to any disclaimer, the term of this patent is extended or adjusted under 35 U.S.C. 154(b) by 79 days.

(21) Appl. No.: 18/890,304

(22) Filed: Sep. 19, 2024

(65) Prior Publication Data

US 2025/0123127 A1 Apr. 17, 2025

Related U.S. Application Data

(60) Provisional application No. 63/543,988, filed on Oct. 13, 2023.

(51) Int. Cl.

| | |
|---|---|
| ***G01H 9/00*** | (2006.01) |
| ***G01D 5/353*** | (2006.01) |
| ***H04B 10/071*** | (2013.01) |

(52) U.S. Cl.

CPC ......... *G01D 5/35361* (2013.01); *G01H 9/004* (2013.01); *H04B 10/071* (2013.01)

(58) Field of Classification Search

CPC ........... G01D 5/35361; G01D 5/35358; G01D 5/35364; G01H 9/004; H04B 10/071

See application file for complete search history.

(56) References Cited

U.S. PATENT DOCUMENTS

| | | | | |
|---|---|---|---|---|
| 10,917,168 | B2 * | 2/2021 | Huang | H04B 10/071 |
| 2011/0090936 | A1 * | 4/2011 | Kupershmidt | G01K 11/32 374/E11.015 |
| 2016/0109222 | A1 * | 4/2016 | Wang | G01L 1/242 356/34 |
| 2017/0199088 | A1 * | 7/2017 | Therrien | G01K 11/32 |
| 2017/0315261 | A1 * | 11/2017 | Bartling | G01H 9/004 |
| 2021/0356613 | A1 * | 11/2021 | Ip | G01H 9/004 |
| 2021/0360029 | A1 * | 11/2021 | Huang | H04B 10/85 |
| 2022/0086541 | A1 * | 3/2022 | Ji | H04B 10/071 |

(Continued)

FOREIGN PATENT DOCUMENTS

KR 1020220071542 A 5/2022

OTHER PUBLICATIONS

Iwamura "Optical Fiber Strain Measuring Device and Wavelength Control Method", Mar. 14, 2022, Iwamura (Year: 2022).*

*Primary Examiner* — Sang H Nguyen

(74) *Attorney, Agent, or Firm* — Vincent Duffy

(57) ABSTRACT

Disclosed are systems, methods, and structures that increase overall sensing reach of a DFOS system and reduces system cost without sacrificing sensed signal quality by employing a cascaded arrangement of DFOS interrogators and operating method providing backscattering DFOS, maintaining each span within a desired length which can advantageously be determined by signal quality, pulse rate, or other factors such as physical layout. The cascaded DFOS interrogators work independently while sharing the pulse light produced by the first interrogator in a cascaded series of interrogators. The light is amplified in successive fiber spans and a circulator may be employed to cut-off any backscattered signal.

12 Claims, 16 Drawing Sheets

(56) References Cited

U.S. PATENT DOCUMENTS

| | | | | |
|---|---|---|---|---|
| 2022/0187121 | A1* | 6/2022 | Hu | G01D 5/35358 |
| 2023/0052444 | A1* | 2/2023 | Wilson | H04J 14/02 |
| 2023/0130788 | A1* | 4/2023 | Ozharar | G01H 9/004 385/12 |
| 2023/0388012 | A1* | 11/2023 | Brenne | G01M 11/31 |

* cited by examiner

CASCADED DFOS TO REDUCE SYSTEM COST AND INCREASE SENSING REACH

CROSS-REFERENCE TO RELATED APPLICATIONS

This application claims the benefit of U.S. Provisional Patent Application Ser. No. 63/543,988 filed Oct. 13, 2023 the entire contents of which is incorporated by reference as if set forth at length herein.

FIELD OF THE INVENTION

This application relates generally to distributed fiber optic sensing (DFOS) systems, methods, structures, and related technologies. More particularly, it pertains to a cascaded DFOS arrangement and method that advantageously reduces system cost while increasing geographic system reach.

BACKGROUND OF THE INVENTION

Distributed fiber optic sensing (DFOS) systems, methods, and structures have found widespread utility in contemporary industry and society. The present invention and disclosure provide a DFOS arrangement and method that advantageously increases overall sensing reach of the DFOS system and reduces system cost without sacrificing sensed signal quality.

SUMMARY OF THE INVENTION

An advance in the art is made according to aspects of the present disclosure directed to systems, methods, and structures that increase overall sensing reach of a DFOS system and reduces system cost without sacrificing sensed signal quality.

In sharp contrast to the prior art, systems and method according to aspects of the present disclosure employ a cascaded arrangement of DFOS interrogators and operating method providing backscattering DFOS, keeping each span within desired length (which can be determined by the signal quality, or pulse rate, or other factors such as physical layout). The cascaded DFOS interrogators work independently except that the light or the light pulse is from the laser of the first interrogator. Each subsequent span amplifies the light and uses a circulator to cut off the backscattered signal.

As we shall show and describe, our inventive arrangement provides for the DSP function for the entire link (i.e., the DSP function in all the interrogators of 1)) to be centralized, while the optical signal transmission/receiving/digitizing functions are still cascaded. Additionally, the use of optical signal from the first interrogator (or the centralized interrogator) enables the use of only one single laser for the entire link. Operationally, our inventive cascaded arrangement isolates the backscattered signal from each span so that each span is considered as one independent backscattering DFOS sensing link. The centralized DSP or DSP and signal Rx elements reduce the power consumption and physical size for each intermediate node, which makes it suitable for undersea sensing.

Finally, our inventive systems and methods are applicable to any DFOS system that uses backscattered signal detection, such as Rayleigh backscattering for distributed vibration sensing (DVS) or distributed acoustic sensing (DAS), Raman backscattering for distributed temperature sensing (DTS), and Brillouin Optical Time Domain Reflectometry (BOTDR) for distributed fiber strain and temperature sensing. The interrogation signal can be a pulse of a short period, or a code spanning multiple pulse period. The description here uses DVS or DAS and the interrogation signal as a single pulse, as example to explain the method

BRIEF DESCRIPTION OF THE DRAWING

FIG. 7(A) and FIG. 7(B) are schematic block diagrams showing illustrative downstream interrogator architectures using coherent detection in which: FIG. 7(A) shows the interrogation pulse generated locally; and FIG. 7(B) shows interrogation pulse from first interrogator all according to aspects of the present disclosure.

DETAILED DESCRIPTION OF THE INVENTION

Figure 1A:
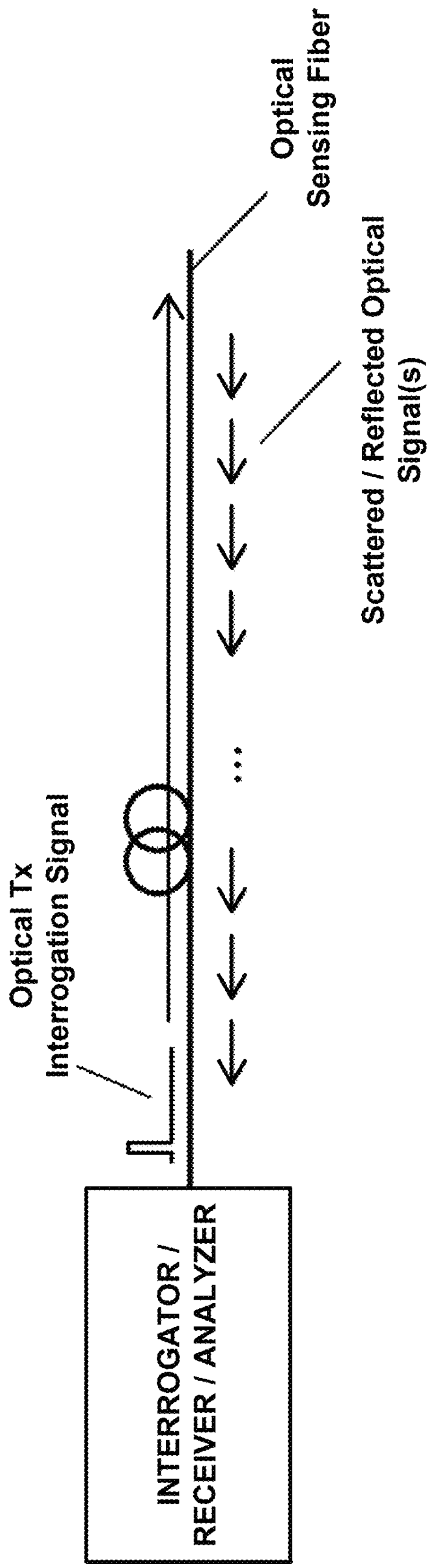
FIG. 1(A) and FIG. 1(B) are schematic diagrams showing an illustrative prior art uncoded and coded DFOS systems.

The following merely illustrates the principles of this disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor (s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background, we note that distributed fiber optic sensing systems convert the fiber to an array of sensors distributed along the length of the fiber. In effect, the fiber becomes a sensor, while the interrogator generates/injects laser light energy into the fiber and senses/detects events along the fiber length.

As those skilled in the art will understand and appreciate, DFOS technology can be deployed to continuously monitor vehicle movement, human traffic, excavating activity, seismic activity, temperatures, structural integrity, liquid and gas leaks, and many other conditions and activities. It is used around the world to monitor power stations, telecom networks, railways, roads, bridges, international borders, critical infrastructure, terrestrial and subsea power and pipelines, and downhole applications in oil, gas, and enhanced geothermal electricity generation. Advantageously, distributed fiber optic sensing is not constrained by line of sight or remote power access and—depending on system configuration—can be deployed in continuous lengths exceeding 30 miles with sensing/detection at every point along its length. As such, cost per sensing point over great distances typically cannot be matched by competing technologies.

Distributed fiber optic sensing measures changes in "backscattering" of light occurring in an optical sensing fiber when the sensing fiber encounters environmental changes including vibration, strain, or temperature change events. As noted, the sensing fiber serves as sensor over its entire length, delivering real time information on physical/environmental surroundings, and fiber integrity/security. Furthermore, distributed fiber optic sensing data pinpoints a precise location of events and conditions occurring at or near the sensing fiber.

Figure 1B:
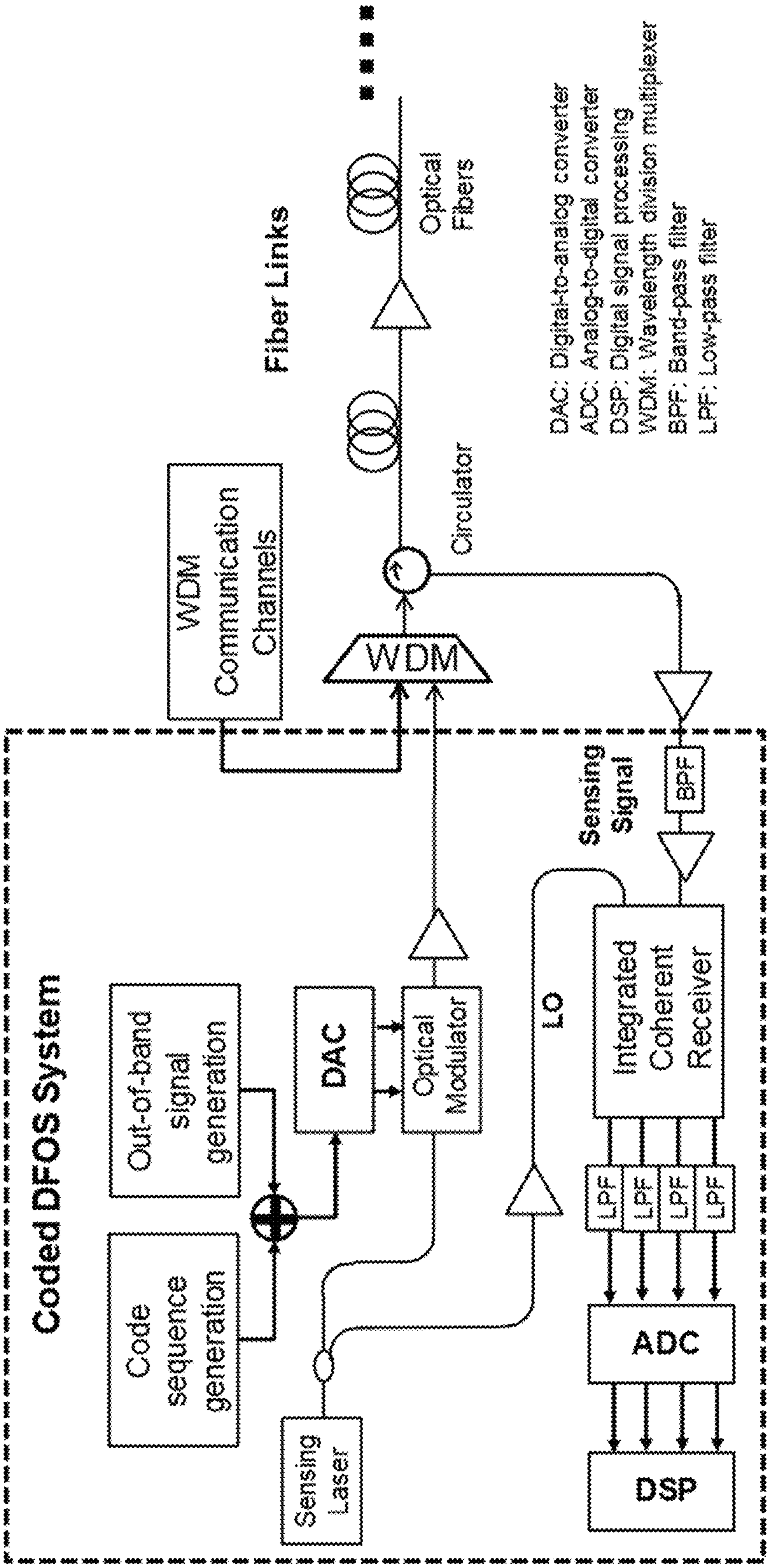

A schematic diagram illustrating the generalized arrangement and operation of a distributed fiber optic sensing system that may advantageously include artificial intelligence/machine learning (AI/ML) analysis is shown illustratively in FIG. 1(A). With reference to FIG. 1(A), one may observe an optical sensing fiber that in turn is connected to an interrogator. While not shown in detail, the interrogator may include a coded DFOS system that may employ a coherent receiver arrangement known in the art such as that illustrated in FIG. 1(B).

As is known, contemporary interrogators are systems that generate an input signal to the optical sensing fiber and detects/analyzes reflected/backscattered and subsequently received signal(s). The received signals are analyzed, and an output is generated which is indicative of the environmental conditions encountered along the length of the fiber. The backscattered signal(s) so received may result from reflections in the fiber, such as Raman backscattering, Rayleigh backscattering, and Brillion backscattering.

As will be appreciated, a contemporary DFOS system includes the interrogator that periodically generates optical pulses (or any coded signal) and injects them into an optical sensing fiber. The injected optical pulse signal is conveyed along the length optical fiber.

At locations along the length of the fiber, a small portion of signal is backscattered/reflected and conveyed back to the interrogator wherein it is received. The backscattered/reflected signal carries information the interrogator uses to detect, such as a power level change that indicates—for example—a mechanical vibration.

The received backscattered signal is converted to electrical domain and processed inside the interrogator. Based on the pulse injection time and the time the received signal is detected, the interrogator determines at which location along the length of the optical sensing fiber the received signal is returning from, thus able to sense the activity of each location along the length of the optical sensing fiber. Classification methods may be further used to detect and locate events or other environmental conditions including acoustic and/or vibrational and/or thermal along the length of the optical sensing fiber.

Of particular interest, distributed acoustic sensing (DAS) is a technology that uses fiber optic cables as linear acoustic sensors. Unlike traditional point sensors, which measure acoustic vibrations at discrete locations, DAS can provide a continuous acoustic/vibration profile along the entire length of the cable. This makes it ideal for applications where it's important to monitor acoustic/vibration changes over a large area or distance.

Distributed acoustic sensing/distributed vibration sensing (DAS/DVS), also sometimes known as just distributed acoustic sensing (DAS), is a technology that uses optical fibers as widespread vibration and acoustic wave detectors. Like distributed temperature sensing (DTS), DVS allows for continuous monitoring over long distances, but instead of measuring temperature, it measures vibrations and sounds along the fiber.

DVS operates as follows.

Light pulses are sent through the fiber optic sensor cable.

As the light travels through the cable, vibrations and sounds cause the fiber to stretch and contract slightly.

These tiny changes in the fiber's length affect how the light interacts with the material, causing a shift in the backscattered light's frequency.

By analyzing the frequency shift of the backscattered light, the DAS/DVS system can determine the location and intensity of the vibrations or sounds along the fiber optic cable.

Similar to DTS, DAS/DVS offers several advantages over traditional point-based vibration sensors: High spatial resolution: It can measure vibrations with high granularity, pinpointing the exact location of the source along the cable; Long distances: It can monitor vibrations over large areas, covering several kilometers with a single fiber optic sensor cable; Continuous monitoring: It provides a continuous picture of vibration activity, allowing for better detection of anomalies and trends; Immune to electromagnetic interference (EMI): Fiber optic cables are not affected by electrical noise, making them suitable for use in environments with strong electromagnetic fields.

DAS/DVS technology has a wide range of applications, including: Structural health monitoring: Monitoring bridges, buildings, and other structures for damage or safety concerns; Pipeline monitoring: Detecting leaks, blockages, and other anomalies in pipelines for oil, gas, and other fluids; Perimeter security: Detecting intrusions and other activities along fences, pipelines, or other borders; Geophysics: Studying seismic activity, landslides, and other geological phenomena; and Machine health monitoring: Monitoring the health of machinery by detecting abnormal vibrations indicative of potential problems.

As the technology continues to develop, DAS/DVS is expected to become even more widely used in various fields where continuous and sensitive acoustic/vibration monitoring is crucial.

With the above in mind, we note that distributed fiber optics sensing (DFOS) continues to gain more interest as technology advances to use existing telecom fiber network for various sensing applications, such as traffic monitoring, public safety surveillance, road condition monitoring, and so on. Backscattered fiber sensing, including Rayleigh backscattering for distributed acoustic sensing (DAS), Raman backscattering for distributed temperature sensing (DTS), and Brillouin optical time domain reflectometer (BOTDR) for fiber strain and temperature sensing, are widely deployed and have tens of kilometers sensing distance.

As will be appreciated, it becomes challenging to further extend the reach because of the backscattered power level, and there is trade-off between the fiber length and pulse rate (which is equivalent to the sampling rate for each location). Even though recent innovation enables above 1,000 km DAS, the pulse rate is only about 100 Hz, which means the system loses a lot of details. In addition, systems such as DAS require narrow linewidth highly stable laser that is usually expensive.

Another distributed fiber sensing method, using forward phase detection, has been proposed to detect the activities along the fiber through the phase change of the received light. It has the potential to reach thousands of kilometers in distance and cover almost the entire band from DC to ultra-high frequency. However, disturbance anywhere along the fiber are overlapped, making it difficult to separate the activities from each location.

Advantageously, and as we shall describe further, our invention provides techniques that increase the overall sensing reach and reduce the system cost, without sacrificing the sensed signal quality.

According to aspects of the present disclosure, we inventively employ cascaded method in backscattering DFOS, keeping each span within desired length (which can be determined by the signal quality, or pulse rate, or other factors such as physical layout). The cascaded DFOS interrogators work independently except that the light or the light pulse is from the laser of the first interrogator. Each subsequent span amplifies the light and uses a circulator to cut off the backscattered signal.

The DSP function for the entire link (i.e., the DSP function in all the interrogators of 1)) is centralized, while the optical signal transmission/receiving/digitizing functions are still cascaded.

The DSP function and the signal receiving/digitizing are both centralized, while only the optical signal transmission is cascaded.

The use of optical signal from the first interrogator (or the centralized interrogator) enables the usage of a single laser for the entire link.

The cascading method isolates the backscattered signal from each span so that each span is considered as one independent backscattering DFOS sensing link. The centralized DSP or DSP and signal Rx elements reduces the power consumption and physical size for each intermediate node, which makes it suitable for undersea sensing.

Figure 2:
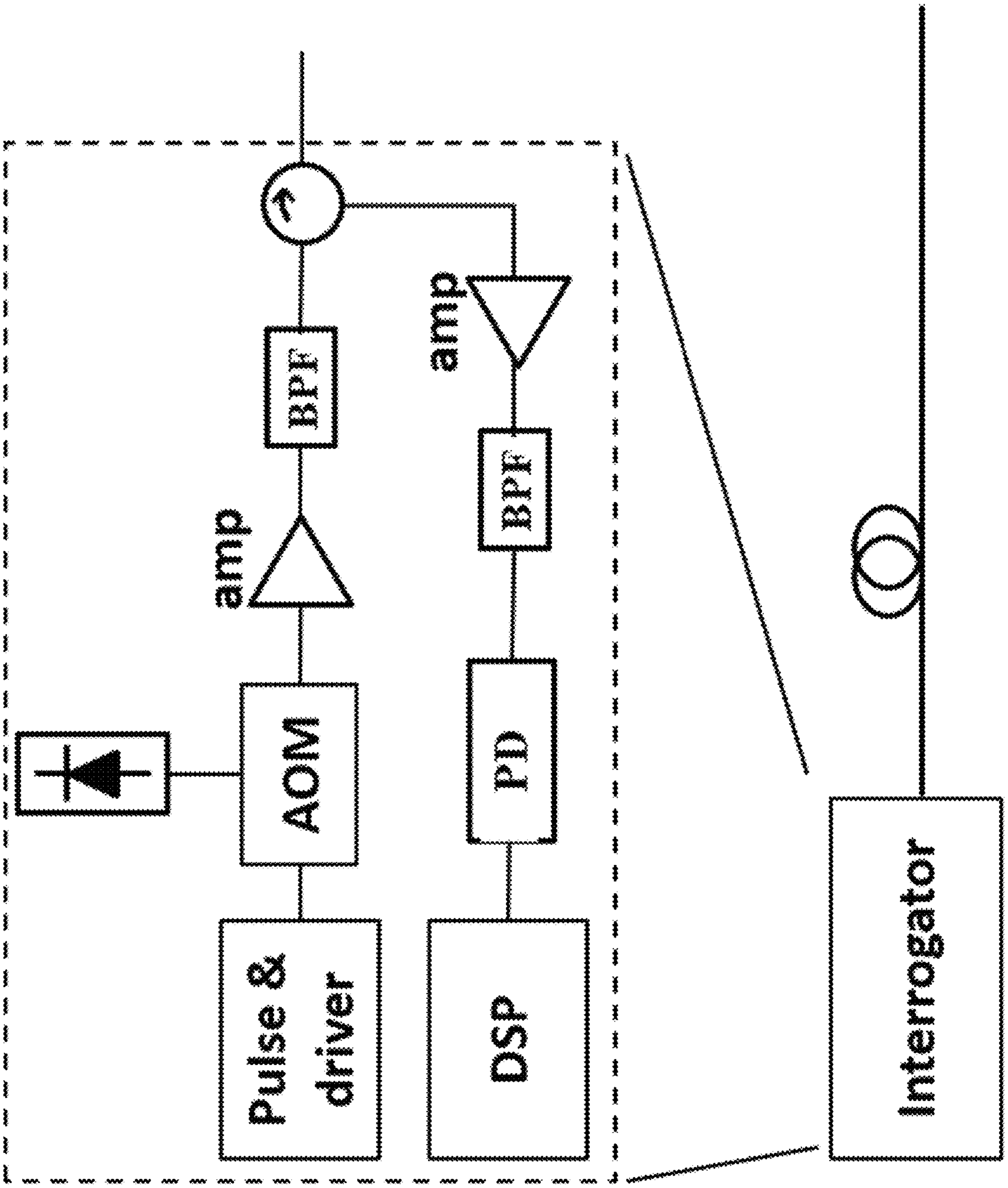
FIG. 2 is a schematic block diagram showing an illustrative prior art architecture for distributed vibration sensing (DVS).

FIG. 2 is a schematic block diagram showing an illustrative prior art architecture for distributed vibration sensing (DVS).

Figure 3:
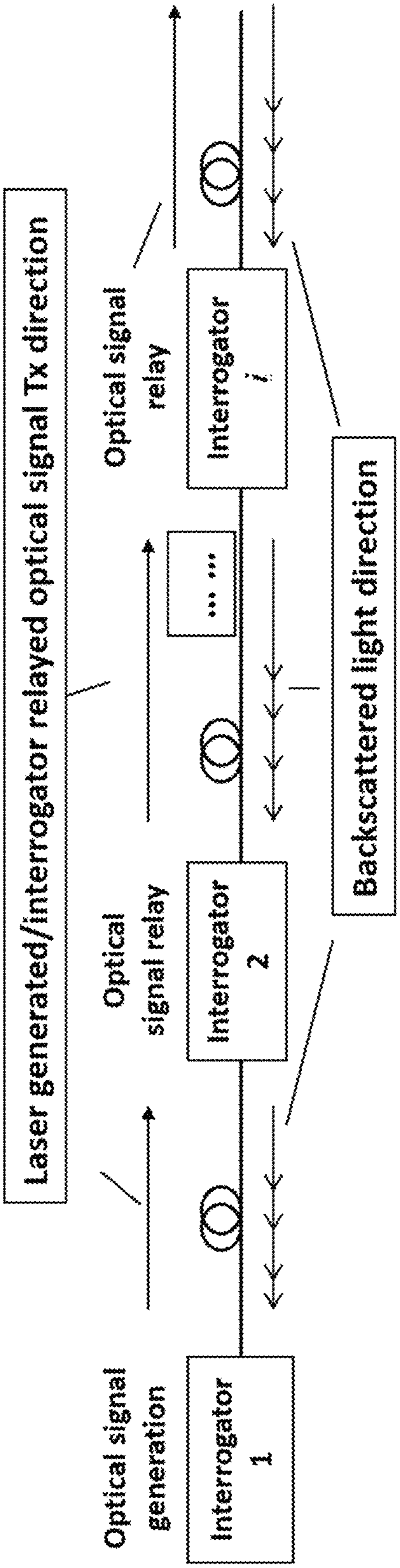
FIG. 3 is a schematic block diagram showing an illustrative cascaded architecture according to aspects of the present disclosure.

As shown therein, the interrogator has both an optical Tx signal generation circuit and Rx signal detection/digitizing/processing circuit. The Tx signal is coupled to its directly attached optical fiber. The backscattered signal from this directly connected optical fiber carries the vibration information of each location along the fiber FIG. 3 is a schematic block diagram showing an illustrative cascaded architecture according to aspects of the present disclosure.

Figure 4:
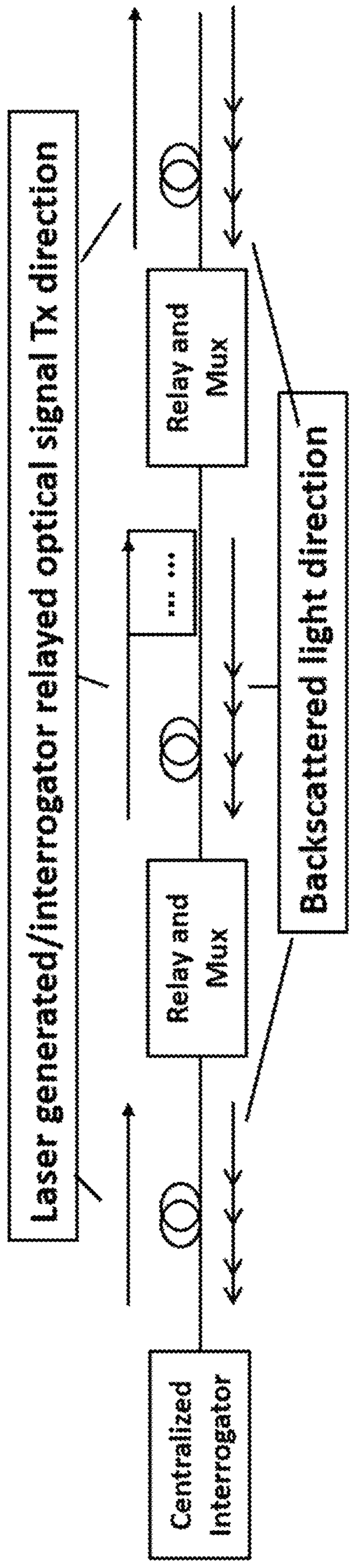
FIG. 4 is a schematic block diagram showing an illustrative cascaded architecture with centralized interrogator, according to aspects of the present disclosure.

As shown in that figure, the interrogators and the fibers form a cascaded link. The first interrogator in the link has a signal generation circuit that is the same or like that in FIG. 2. Each of the other interrogators, called a down-stream interrogator, uses the optical signal from the first one (and relayed by its upstream interrogators) to generate its sensing signal, and relays it to the next node in the link. Each interrogator detects the backscattered signal from the fiber in between itself and its direct down-stream neighbor node A variant from FIG. 3 is that the interrogating functions are centralized in the first node of the cascaded link. Each intermediate node has a signal relay to pass the optical signal to its next node, and a multiplexer for the Rx direction, to have all the backscattered signal from its down-stream nodes multiplexed and sent to the upstream node. This is shown in FIG. 4., which is a schematic block diagram showing an illustrative cascaded architecture with centralized interrogator, according to aspects of the present disclosure.

In one implementation, this multiplexing happens in optical domain. In one implementation, this multiplexing happens in electrical domain, or specifically, to the digitized backscattered signal. These solutions will benefit the deployments that the down-stream nodes have low power consumption and smaller footprint. Also, a centralized interrogator may use the processing power more efficiently, with enhanced processing.

Figure 5:
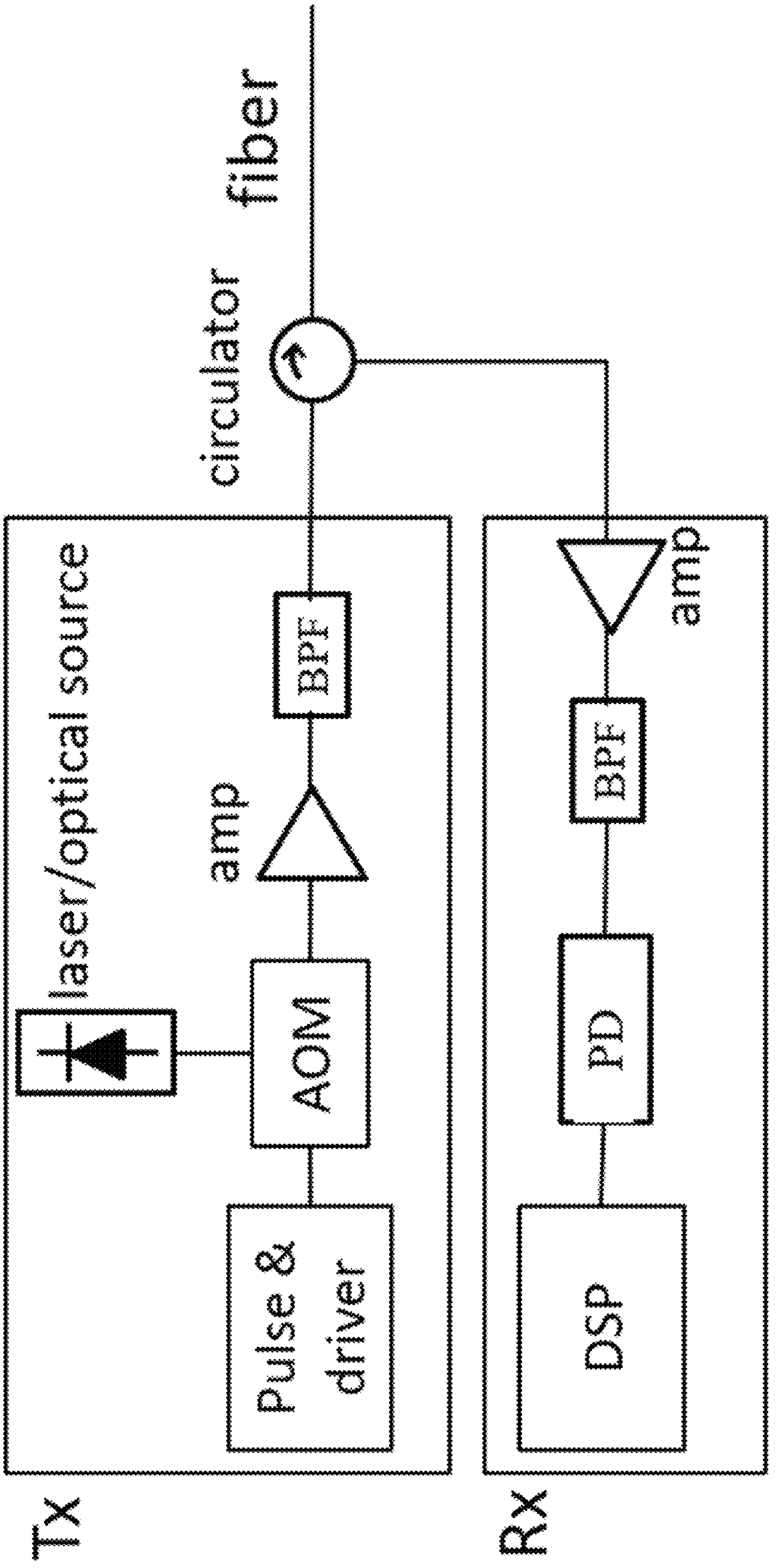
FIG. 5 is a schematic block diagram showing illustrative prior art architecture of DVS interrogator-details.

The proposed method in this invention can be applied to any DFOS system that uses backscattered signal detection, such as Rayleigh backscattering for distributed vibration sensing (DVS) or distributed acoustic sensing (DAS), Raman backscattering for distributed temperature sensing (DTS), and Brillouin Optical Time Domain Reflectometry (BOTDR) for distributed fiber strain and temperature sensing. The interrogation signal can be a pulse of a short period, or a code spanning multiple pulse period. The description here uses DVS or DAS and the interrogation signal as a single pulse, as example to explain the method As we have previously shown, FIG. 1 illustrates an example architecture of a distributed vibration sensing system in prior art. It employs an interrogator and a length of optical fiber cable. The detail of the interrogator is shown illustratively in FIG. 5, which is a schematic block diagram showing illustrative prior art architecture of DVS interrogator-details.

As may be observed from that figure, the illustrative interrogator has a transmit (Tx) module that includes a laser to generate the optical light, a pulse generator and driver, an acousto-optic modulator (AOM) to gate the optical light into short pulses as the interrogation source, an amplifier to increase the signal power, and a band-pass filter (BPF) to eliminate the out-of-band noise. The receiver (Rx) module has another amplifier, BPF, and photodetector (PD), followed by a digital signal processing unit (DSP). An optical circulator is used to isolate the Tx and Rx signals. In the prior art, each DFOS system includes an interrogator with both Tx and Rx.

Cascaded Interrogators

Figure 6:
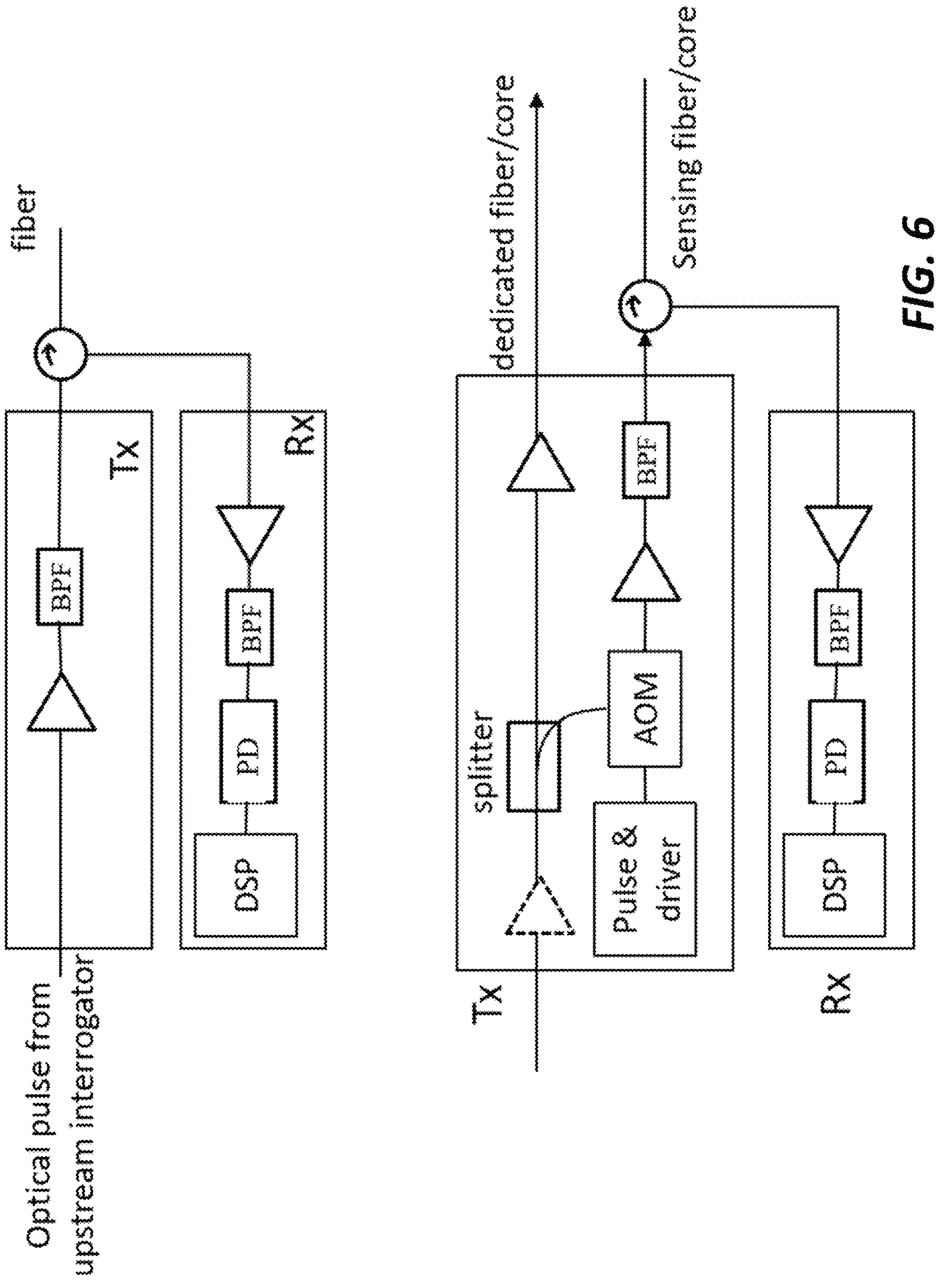
FIG. 6 is a schematic block diagram showing an illustrative downstream interrogator architecture in which (upper) use optical pulse generated from first interrogator; and (lower) use CW light from first interrogator, interrogation signal generated locally according to aspects of the present disclosure.

The present invention arranges the interrogators in a cascaded way, that the fiber end of one interrogator A is connected to another interrogator B (B is called A's downstream interrogator, while A is called B's upstream), as shown in FIG. 3. Each upstream interrogator processes the backscattered signal from the fiber in between. All the interrogators have similar architecture in the Rx direction. For Tx direction, all the downstream interrogarors use the optical light generated from the first one in the link. In one implementation, the optical pulse generated from the first interrogator is amplified and used as its interrogation signal; it is also relayed to the next interrogator in the link. This is shown in FIG. 6 (upper), in which FIG. 6 is a schematic block diagram showing an illustrative downstream interrogator architecture in which (upper) use optical pulse generated from first interrogator; and (lower) use CW light from first interrogator, interrogation signal generated locally according to aspects of the present disclosure.

In one implementation, the CW (continuous wave) light from the laser in the first interrogator is sent downstream using another optical fiber or a core of a fiber. Each downstream interrogator generates its own interrogation pulse using this signal. This is shown in FIG. 6 (lower).

For systems using coherent detection, which is a common practice in DAS, the CW light from the laser source needs to reach the interrogators in the link, to be used as LO (local oscillator) signal in its detector.

Figure 7A:
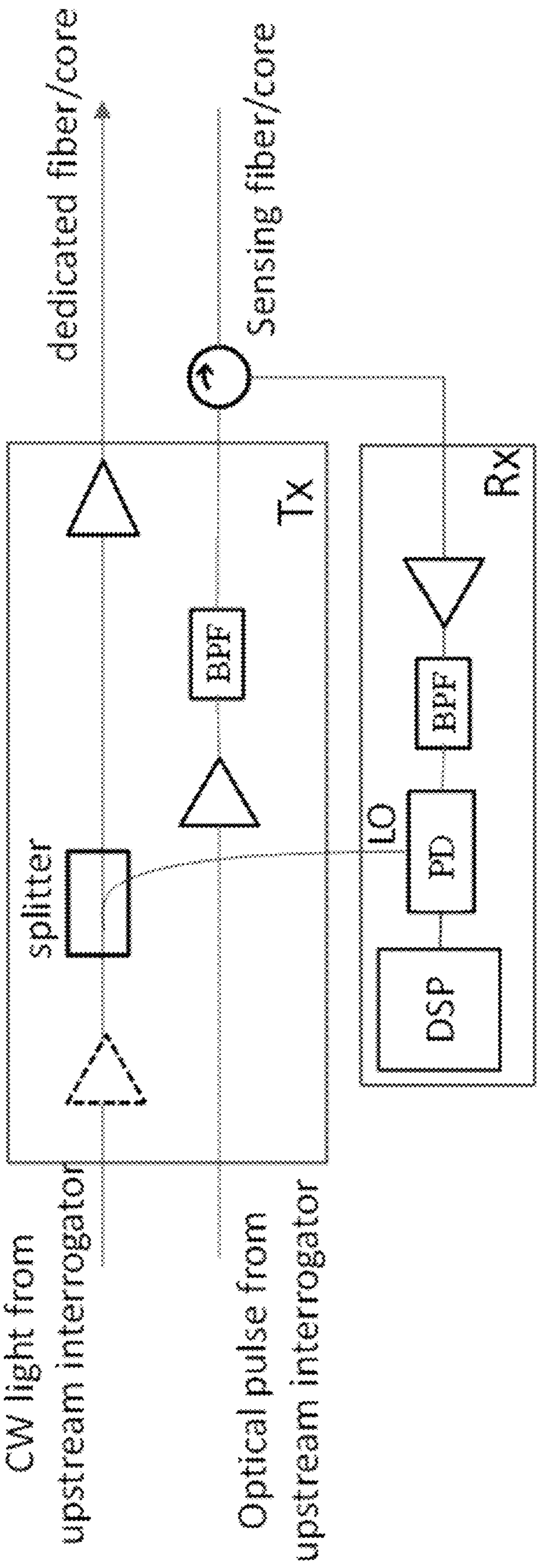
Figure 7B:
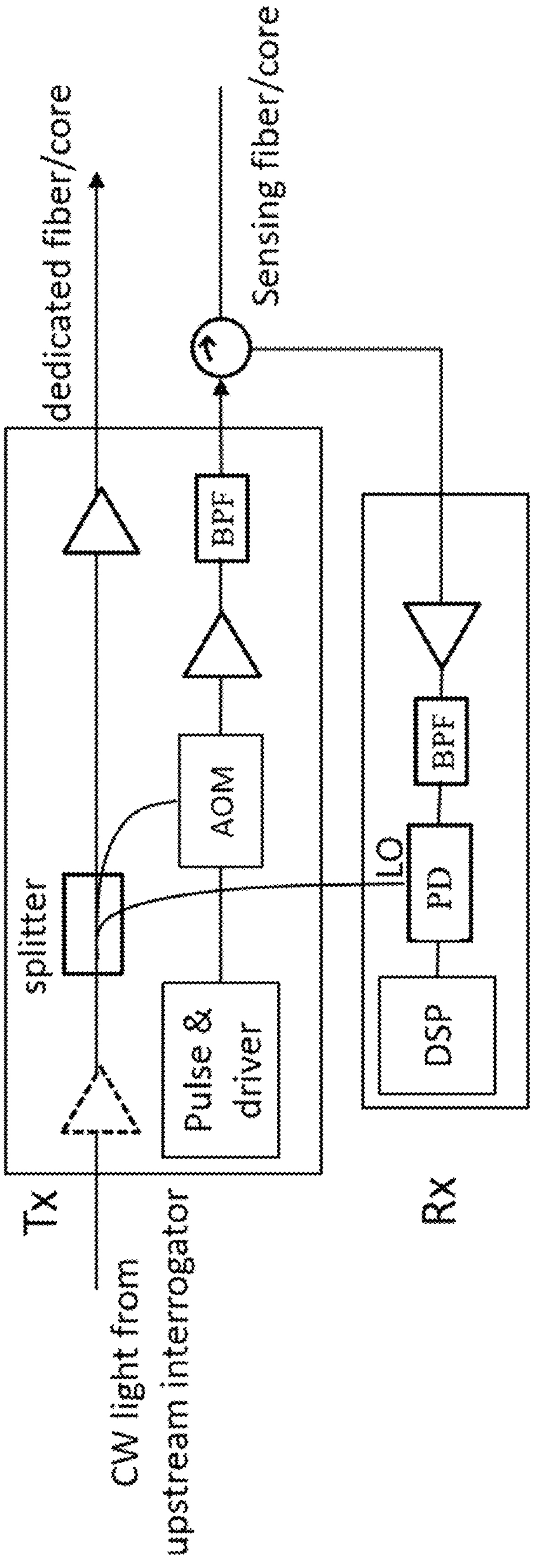

FIG. 7(A) and FIG. 7(B) are schematic block diagrams showing illustrative downstream interrogator architectures using coherent detection in which: FIG. 7(A) shows the interrogation pulse generated locally; and FIG. 7(B) shows interrogation pulse from first interrogator all according to aspects of the present disclosure.

In one implementation, the CW light goes through a separate fiber or one of the fiber cores, with the interrogation pulse generated either locally—FIG. 7(A)—or from the first interrogator—FIG. 7(B). For the latter case, if the CW light and the pulse goes through different fibers, these fibers must be always closely located (for example, inside the same fiber cable) to keep their coherency.

Figure 8:
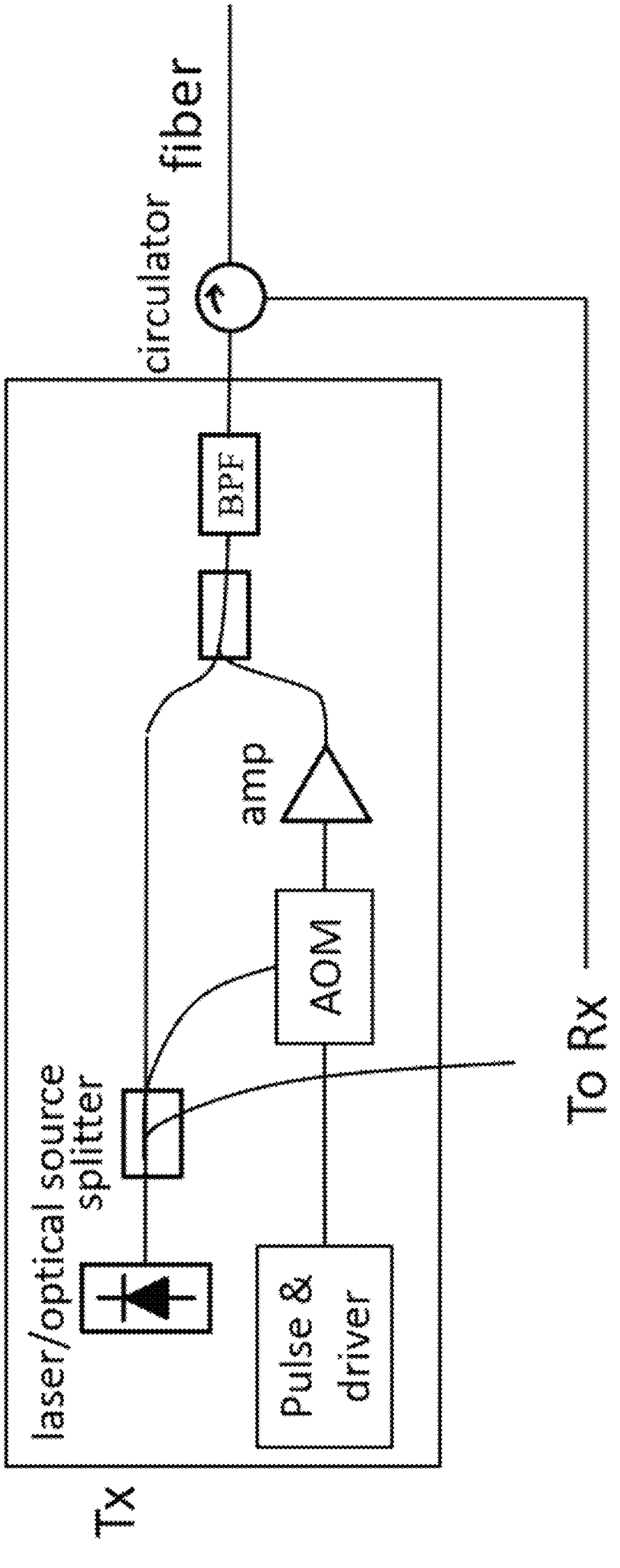
FIG. 8 is a schematic block diagram showing an illustrative architecture in which Tx in first interrogator, for CW light and pulse pass through the same fiber according to aspects of the present disclosure.
Figure 9:
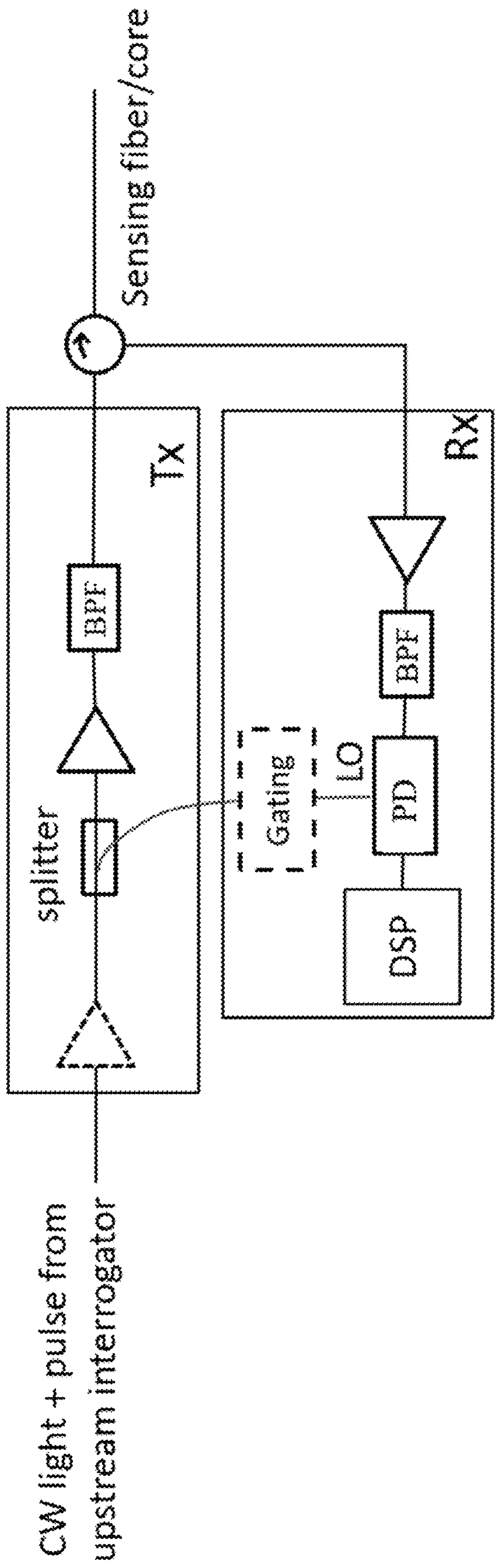
FIG. 9 is a schematic block diagram showing an illustrative interrogator architecture using coherent detection in which CW light and interrogation pulse pass through the same fiber according to aspects of the present disclosure.

In one implementation, the CW light and the pulse are frequency-shifted so that they can use the same fiber. The first interrogator combines the CW light and the amplified pulse before feeding into the sensing fiber, as shown FIG. 8 that is a schematic block diagram showing an illustrative architecture in which Tx in first interrogator, for CW light and pulse pass through the same fiber according to aspects of the present disclosure.

Figure 10:
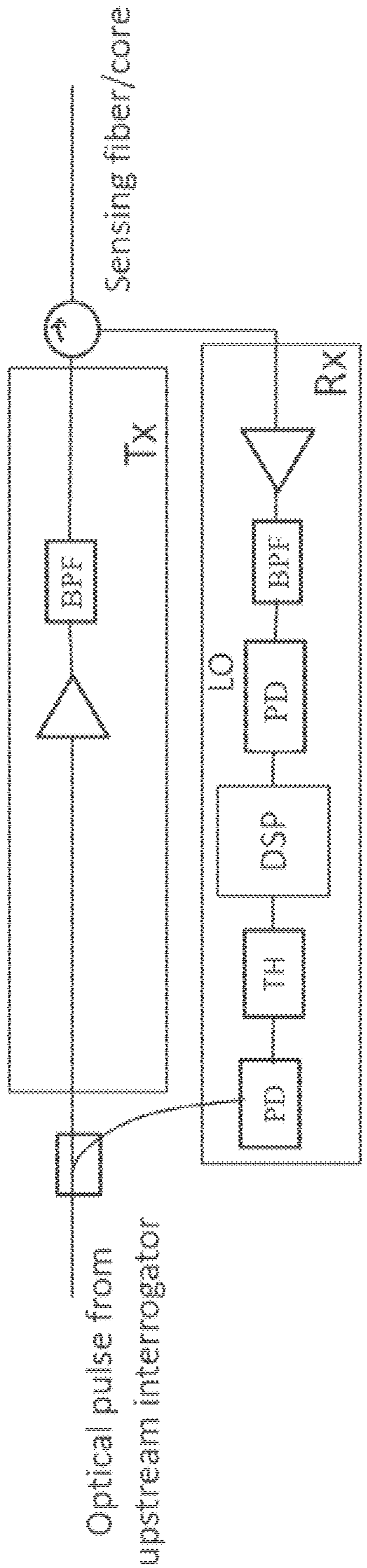
FIG. 10 is a schematic block diagram showing an illustrative architecture using photodetector and thresholder to generate frame start indicator according to aspects of the present disclosure.

In downstream interrogators, the LO for coherent detection is that split from the mixed signal. Because the interrogation pulse usually uses high power, there might be power imbalance. In this case a gating device, such as an AOM, can be used to get rid of the pulse An interrogator generally uses the interrogation pulse starting time as reference to decide the backscattered signal location. For methods using pulse from the first interrogator, one solution is to split the pulse signal and use a photodetector (PD), followed by a thresholder (TH) to convert the pulse to electrical domain and feed into the DSP. This is shown in FIG. 10, which is a schematic block diagram showing an illustrative architecture using photodetector and thresholder to generate frame start indicator according to aspects of the present disclosure.

Figure 11:
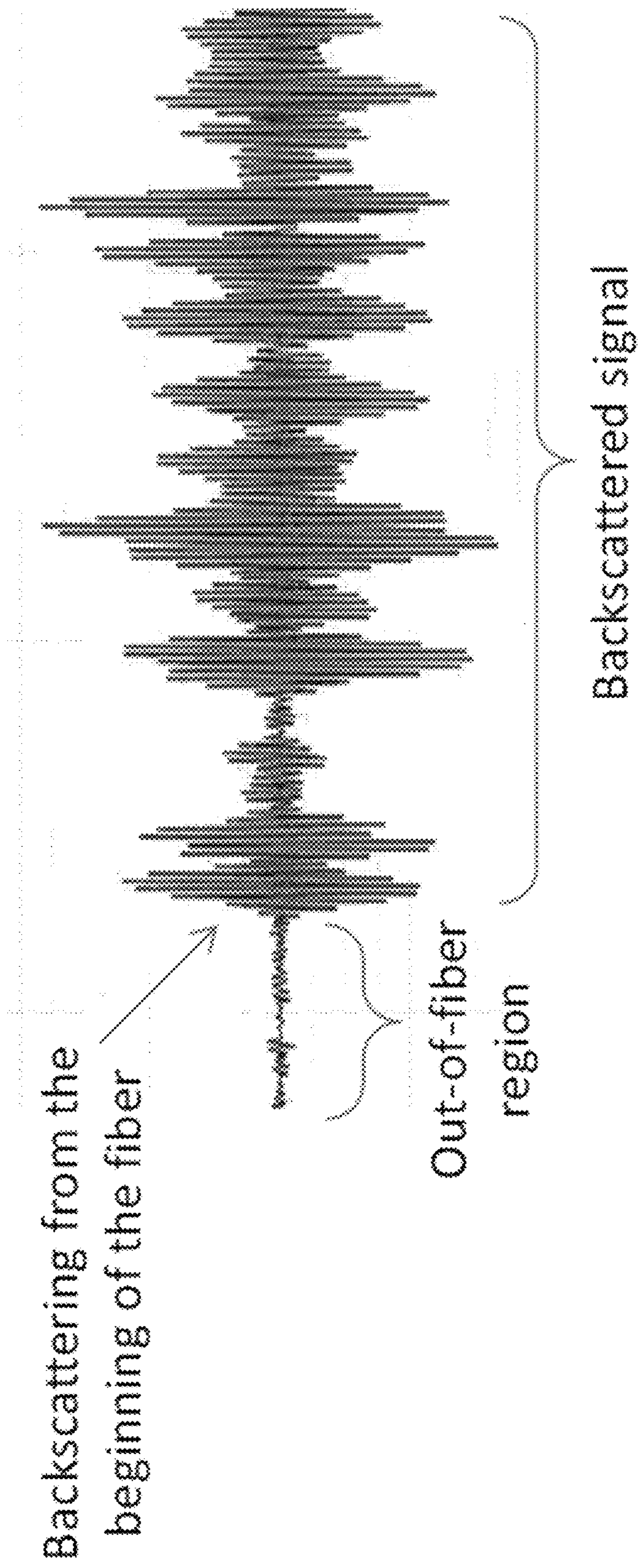
FIG. 11 is a Rayleigh backscattered signal illustration according to aspects of the present disclosure.

Alternatively, because the backscattered signal from the beginning of the fiber is much higher than the end of the fiber, or when the pulse period is longer than the equivalent fiber length, usually there is an amplitude jump (see FIG. 11, using Rayleigh backscattering as example). The DSP logic can use this amplitude jump to determine the head of the fiber Centralized Interrogator with Cascaded Sensing Link An independent interrogator, either cascaded or standalone, processes its sensed data locally. Such processing may not be efficient, in terms of processing power and knowledge base. In some applications, such as in undersea sensing, the downstream sensing nodes need to be low power consumption and small footprint, which are both beyond the capability of a regular independent interrogator. A centralized solution can solve these problems.

A centralized interrogator is a super system that processes the signals collected from all the sensing links. At the location where traditionally, an independent interrogator is placed, it has the minimum function to forward the sensing signal to the centralized system. Such sensing signal can be in its optical format, or digitized.

Figure 12:
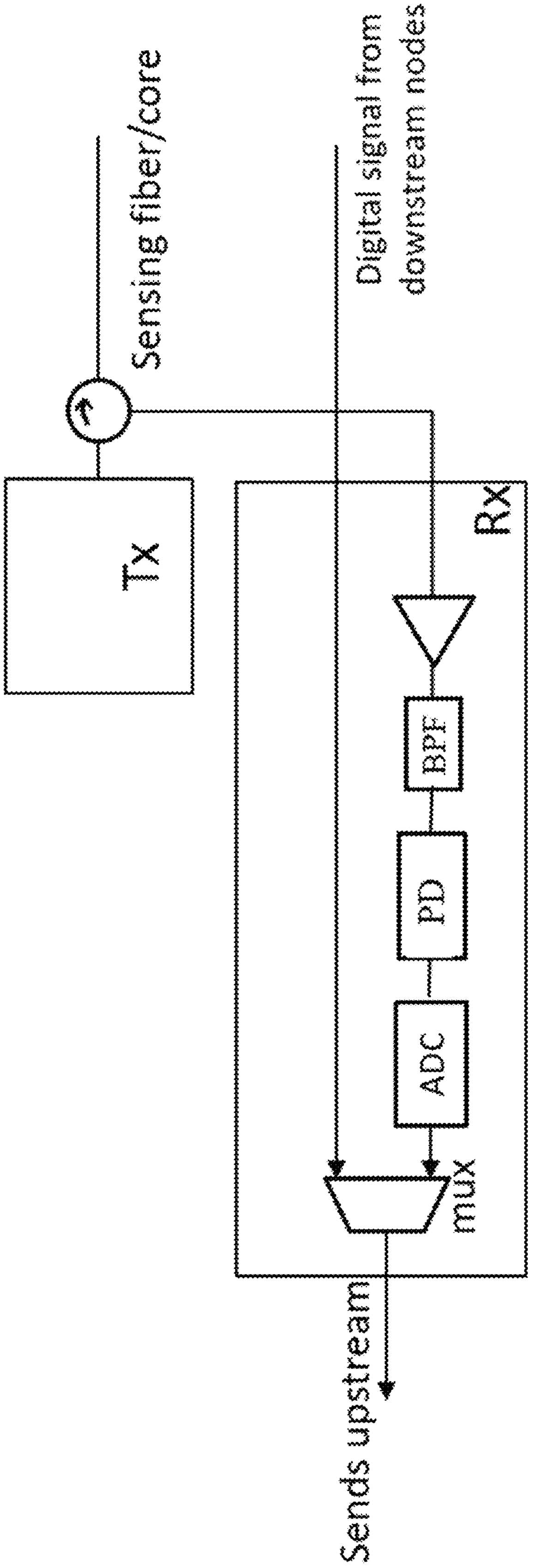
FIG. 12 is a schematic block diagram illustrating backscattered signal digitized and multiplexed with those from downstream nodes according to aspects of the present disclosure.

As shown previously in FIG. 4, the downstream interrogators in the cascaded link are replaced by a "Relay and Mux" unit, which combines the signals from its downstream nodes with its own signal and forwards to upstream. In one implementation, as in FIG. 12, which is a schematic block diagram illustrating backscattered signal digitized and multiplexed with those from downstream nodes according to aspects of the present disclosure.

As shown, the sensed signal is converted to electrical domain and digitized. The result data is then multiplexed with other data from downstream nodes, either using TDM method, or modulate into different WDM wavelengths, and sent towards the interrogator. The digital signal from the downstream nodes may use different wavelengths of the same sensing fiber, or a different fiber.

In one implementation, the backscattered signal is forwarded upstream in its original format, by using a frequency shifter to avoid overlapping.

Figure 13:
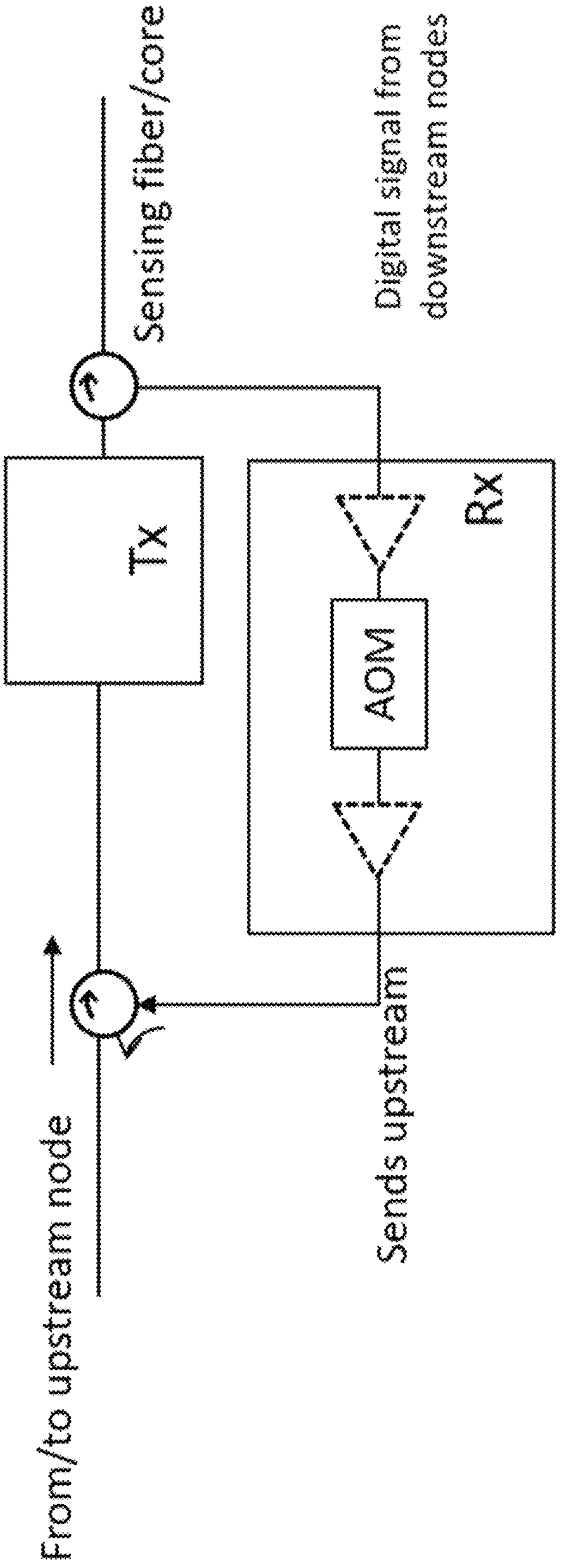
FIG. 13 is a schematic block diagram illustrating backscattered signal forwarded in optical domain using frequency shift according to aspects of the present disclosure.

FIG. 13 is a schematic block diagram illustrating backscattered signal forwarded in optical domain using frequency shift according to aspects of the present disclosure. The arrangement shown therein provides an example using AOM as the frequency shifter, and a circulator to insert the upstream signal into the sensing fiber of the upstream node. Other approaches can be used as well, so long as the backscattered signals from each node do not overlap with others.

Figure 14:
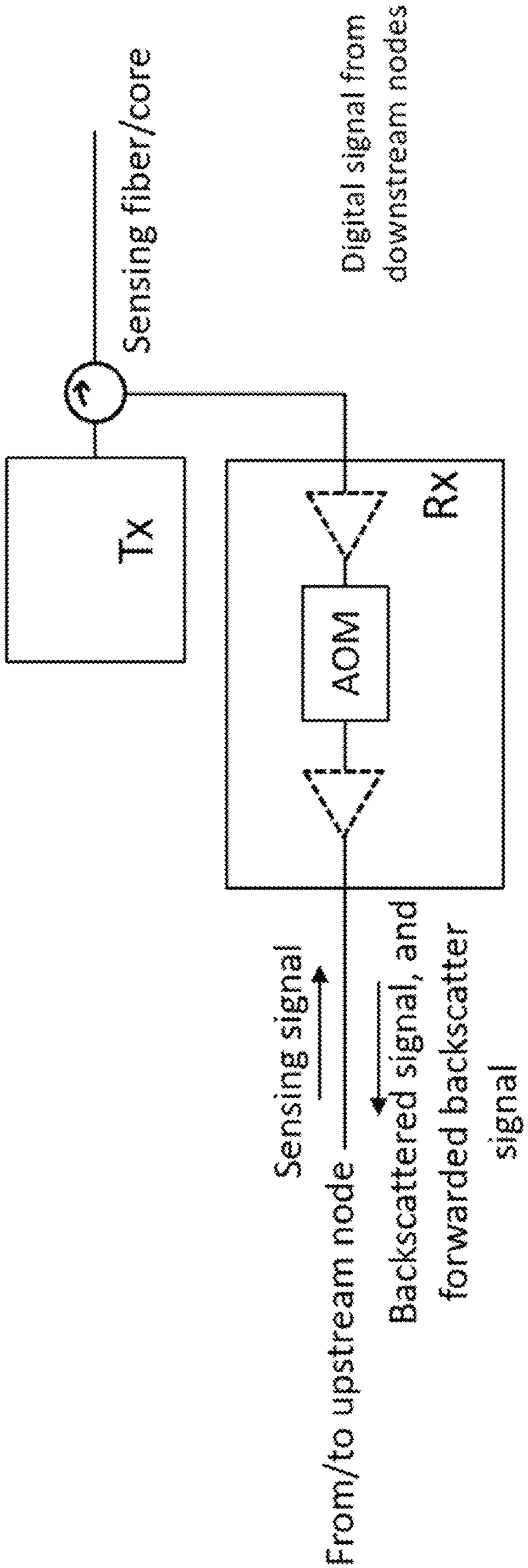
FIG. 14 is a schematic block diagram illustrating locally generated Tx signal, with backscattered signal forwarded to centralized DSP according to aspects of the present disclosure.

In a further implementation, each Tx module may generate its own light. The forwarded upstream signal is directly coupled to its upstream node's sensing fiber. This is given in FIG. 14 which is a schematic block diagram illustrating locally generated Tx signal, with backscattered signal forwarded to centralized DSP according to aspects of the present disclosure. The centralized DSP may track the power of the signal from each segment, to decide its fiber starting location Submarine Application One implementation is in DFOS sensing using submarine cable. As explained in section "centralized interrogator with cascaded sensing link" under part B.2, a centralized interrogator can be in the landing station or other onshore locations, while the cascaded link is the submarine cable with modifications at each of the cascading nodes.

Each of the node in the cascaded link has the relay function, to forward the CW light and/or the optical pulse generated from the onshore station to the downstream nodes. This provides the interrogation signal for each node to its corresponding sensing fiber. In addition, the upstream direction needs to relay the sensed signal from each of the downstream nodes to let it reach the centralized interrogator.

In one approach, each node has a PD (photodetector), an ADC, and a multiplexer, that converts the sensed optical signal to digital domain and multiplexes with all the downstream data. Alternatively, the backscattered optical signal is frequency shifted and sent to upstream node, as shown in FIG. 13. Such frequency shifting makes the backscattered signals from each node away from each other, to avoid interference.

In addition to the existing functions in the submarine cable, this added feature towards the upstream direction is the modification needed.

This implementation enables submarine sensing over multiple spans, to have a reach much longer than prior art which uses a single span. The sensed signal multiplexing/forwarding scheme enables low power consumption and small footprint, which can make it fit in the submarine cable relay nodes. This implementation gives the submarine cable more application than just communication, which for sure will find broader markets and add more values While we have presented our inventive concepts and description using specific examples, our invention is not so limited. Accordingly, the scope of our invention should be considered in view of the following claims.

The invention claimed is:

1. A cascaded distributed fiber optic sensing (DFOS) system comprising:

a first DFOS system in optical communication with an optical sensing fiber;

and one or more additional DFOS systems in optical communication with the optical sensing fibers, wherein the first DFOS system generates DFOS optical interrogation pulses, and wherein the one or more additional DFOS systems do not generate their own interrogation pulses but instead receive and utilize the DFOS optical interrogation pulses generated by the first DFOS system, and wherein the cascaded DFOS system further comprises a circulator in optical communication with the first DFOS system and the optical sensing fiber, wherein the circulator is configured to cut-off backscattered signals from the one or more additional DFOS systems.

2. The cascaded DFOS system of claim 1 wherein each of the one or more additional DFOS systems are configured to analyze only backscattered signals originating in a segment of the optical sensing fiber positioned between an individual one of the one or more additional DFOS systems and a next one of the one or more additional DFOS systems.

3. The cascaded DFOS system of claim 1 wherein only a single laser generates all interrogation light for the system.

4. The cascaded DFOS system of claim 1 wherein the DFOS is one selected from the group consisting of distributed vibration sensing (DVS), distributed acoustic sensing (DAS), and distributed temperature sensing (DTS).

5. The cascaded DFOS system of claim 1 wherein the one or more additional DFOS systems include a signal relay to pass the optical interrogation pulses to its next one of the one or more additional DFOS systems.

6. The cascaded DFOS system of claim 5 wherein the one or more additional DFOS systems include a multiplexer, configured to receive all backscattered signals from its downstream nodes, multiplex the received backscattered signals, and send the multiplexed backscattered signals to its upstream node.

7. The cascaded DFOS system of claim 6 wherein the backscattered signals are sent to the upstream node in an original format.

8. The cascaded DFOS system of claim 7 wherein the backscattered signals frequency shifted prior to being sent to the upstream node.

9. The cascaded DFOS system of claim 6 wherein the backscattered signals are sent to the upstream node such that they do not overlap in frequency.

10. The cascaded DFOS system of claim 1, further comprising an optical amplifier positioned in a successive fiber span between the first DFOS system and the one or more additional DFOS systems, wherein the optical amplifier is configured to amplify the DFOS optical interrogation pulses prior to the pulses being utilized by the one or more additional DFOS systems.

11. A method of operating a cascaded distributed fiber optic sensing (DFOS) system, the method comprising: generating DFOS optical interrogation pulses at a first DFOS system; transmitting the generated DFOS optical interrogation pulses along an optical sensing fiber to one or more additional DFOS systems; receiving and utilizing the transmitted DFOS optical interrogation pulses at the one or more additional DFOS systems without generating local interrogation pulses at the one or more additional DFOS systems; and analyzing backscattered signals originating from segments of the optical sensing fiber to determine sensing data, and wherein the cascaded DFOS system further comprises a circulator in optical communication with the first DFOS system and the optical sensing fiber, wherein the circulator is configured to cut-off backscattered signals from the one or more additional DFOS systems.

12. The cascaded DFOS system of claim 1, wherein the first DFOS system is a centralized interrogator comprising a digital signal processing (DSP) unit configured to perform DSP functions for an entire cascaded link, and wherein the one or more additional DFOS systems are configured to receive, digitize, and multiplex sensed backscattered signals and forward the multiplexed signals upstream to the centralized interrogator.

* * * * *